United States Patent

Smaller et al.

[15] 3,701,133

[45] Oct. 24, 1972

[54] MODULATED MAGNETOOPTIC READOUT SYSTEM

[72] Inventors: Philip Smaller; David Treves, both of Palo Alto, Calif.

[22] Filed: May 5, 1967

[21] Appl. No.: 637,872

Related U.S. Application Data

[63] Continuation-in-part of Ser. No. 593,934, Nov. 14, 1966, abandoned.

[52] U.S. Cl...........................340/174.1, 340/173 LM

[51] Int. Cl..........................G11b 11/10, G11c 13/04

[58] Field of Search.....................340/173, 174.1 MO

[56] References Cited

UNITED STATES PATENTS

| | | | |
|---|---|---|---|
| 3,229,273 | 1/1966 | Baaba | 340/174.1 |
| 3,224,333 | 12/1965 | Kolk | 340/174.1 |

OTHER PUBLICATIONS

IBM Tech. Discl. Bul., Vol. 6, No. 4, Sept. 1963, pp. 145- 146, " Optical Readout for Magnetic Memory" by Barrekette & Fan

*Primary Examiner*—Terrell W. Fears
*Attorney*—Robert G. Clay

[57] ABSTRACT

A noise reduction scheme for magnetooptic readout systems using magnetic media wherein the state of magnetization which represents the stored information is modulated by the application of a modulating field wherein the light reflected from respective binary bits is distinctive thereof, and wherein the modulated component of the distinctive reflected light is detected to determine the state of magnetization and thus the information stored.

5 Claims, 15 Drawing Figures

INVENTORS
PHILIP SMALLER, &
DAVID TREVES
BY
Robert G. Clay
ATTORNEY

INVENTORS
PHILIP SMALLER, &
DAVID TREVES

BY *Robert S. Clay*

ATTORNEY

INVENTORS
PHILIP SMALLER, &
DAVID TREVES
BY
Robert S. Clay
ATTORNEY

INVENTORS
PHILIP SMALLER, &
DAVID TREVES

BY

Robert S. Clay
ATTORNEY

MODULATED MAGNETOOPTIC READOUT SYSTEM

CROSS REFERENCES TO RELATED APPLICATIONS

This application is a continuation-in part of application Ser. No. 593,934 to P. Smaller et al, filed Nov. 14, 1966 and now abandoned and assigned to the same assignee.

The invention herein described was made in the course of a contract with the Department of United States Army.

BACKGROUND OF THE INVENTION

Magnetooptic readout systems provide a means whereby magnetic recordings of high bit densities may be accurately and rapidly retrieved. In the magnetooptic readout technique as presently known and as shown for example in U. S. Pat. No. 3,171,754 issued Mar. 2, 1965 and assigned to the same assignee of the present application, the Kerr or Faraday magnetooptical effect is utilized to detect the presence of magnetic recordings stored in the recording medium. By way of example, the Kerr magnetooptical effect is exhibited by a magnetic surface which is illuminated by a beam of polarized light. The plane of polarization of the beam reflected from the surface magnetized in one direction is rotated with respect to the plane of polarization of light reflected from a surface magnetized, for example, in the opposite direction, such as is commonly done in digital recording. To illustrate, when the polarized beam is reflected from a portion of the magnetized surface having a positive magnetic bit stored therein, the plane of polarization of the reflected beam is rotated through a particular angle. However, when the polarized beam is reflected from a stored negative magnetic bit, the plane of polarization of the reflected beam is rotated through a different angle, generally anti-symmetrically to or opposite the positive bit rotation angle. Thus the presence of a positive or a negative bit stored in the storage medium may be readily detected by sensing the degree and/or angle of rotation of the plane of polarization of the reflected beam.

In such magnetooptic readout systems, noise due to surface imperfections and light fluctuations is always encountered and accordingly, consideration must be given to removing as much of the noise as possible in order to provide optimum readout for the system. There are prior art magnetooptic readout systems presently available which provide some form of modulation for reducing the effects of noise due to media surface imperfections and light fluctations. Such readout systems are described in U. S. Pat. No. 3,284,785 issued Nov. 8, 1966 to O. Kornei and No. 3,268,879 issued Aug. 23, 1966 to S. J. Lins. However all such prior art systems provide modulation of the scanning light beam, not of the state of magnetization in the media as does the present invention.

SUMMARY OF THE INVENTION

The invention provides, in its broad concept, a noise reduction scheme for magnetooptic readout systems using magnetic recording media, wherein the state of magnetization which represents the stored information is itself modulated or altered to produce a modulated component of the light reflected from the media, which component is varied in accordance with the stored information and when detected thus provides a readout signal indicative of the information. The media may be any of the conventional magnetic recording films or tapes, wherein readout is effected by detecting the change of the light level when the state of magnetization is perturbed or altered by an interrogating external means, such as for example, a magnetic field, locally applied heat, or strain applied to the media. The interrogation applied to the media may be either periodic or aperiodic, and the system may define a destructive or non-destructive system with respect to the information stored. The change of light level detected is distinctive of the information stored; in a binary system the change of light level for a "1" bit is different than that for a "0" bit, thus allowing detection and readout.

In addition to the broad concept and by way of example only, there is described hereinafter a preferred embodiment of the present invention utilizing a special recording medium fabricated in any of various forms, which generally defines a heterogeneous structure formed for example of a substrate and relatively low and high coercive force materials deposited in selected configuration to define a storage region and a readout region in the medium. Information is stored in the storage region which in turn is field coupled to the readout region to define a similar magnetization pattern in the latter. In such double-material medium configurations, a coupling mechanism such as a magnetostatic interaction or an exchange interaction must exist between the storage and readout regions of the medium, so that a unique relation results between the magnetization of spin arrangement respectively of the regions. In addition, the effective coupling field existing between the regions must be lower than the coercive force of the storage region and higher than the coercive force of the readout region. An alternating modulating magnetic field is applied to the medium to modulate the magnetization of the readout region without affecting the magnetization of the storage region. By so modulating the magnetization of the readout region and by detecting signals only in a frequency band centered around the frequency of the magnetization modulation, the signal obtained during readout of the recording medium is a function only of the magnetization change and not of spurious light sources.

The present invention accordingly provides a method and apparatus for improving the operation of a magnetooptic readout system by providing a readout scheme that is insensitive to the noise due to surface imperfections and light fluctuations, and which therefore yields a large improvement in the signal-to-noise ratio of the magnetooptic readout system. Unlike prior art systems of modulation, the invention provides the broad concept, as well as specific and preferred apparatus, for modulating the state of magnetization in the media, wherein it is thus readily possible to separate the light reflected due to imperfections, from the light reflected by the magnetization, thereby allowing detection or readout based only on the state of magnetization and not on noise.

It is thus an object of the invention to provide a magnetooptic detection scheme which is insensitive to noise, wherein a magnetic recording medium has information recorded therein in the form of states of magnetization wherein the medium is impressed with a selected interrogating signal which alters the states of magnetization to allow readout.

It is another object of the invention to provide a noise reduction scheme for magnetooptic readout systems wherein a preferred embodiment uses a special magnetic recording medium formed of a relatively high coercive force storage region and a relatively low coercive force readout region, which regions may be in the form of separate layers, precipitates within layers, or suitable configurations.

It is still another object of the invention to provide a noise reduction scheme for use in a magnetooptic readout system utilizing a special medium having a heterogeneous structure formed of different coercive force materials, wherein application of an alterating field modulates the direction of the magnetization in a selected portion of the medium structure, wherein the modulated magnetization is sensed by detecting readout signals within a selected frequency band.

BRIEF DESCRIPTION OF THE DRAWINGS fig. 1 is a schematic block diagram exemplifying apparatus associated with the broad concept of the invention.

DESCRIPTION OF THE PREFERRED EMBODIMENTS

Figure 1:
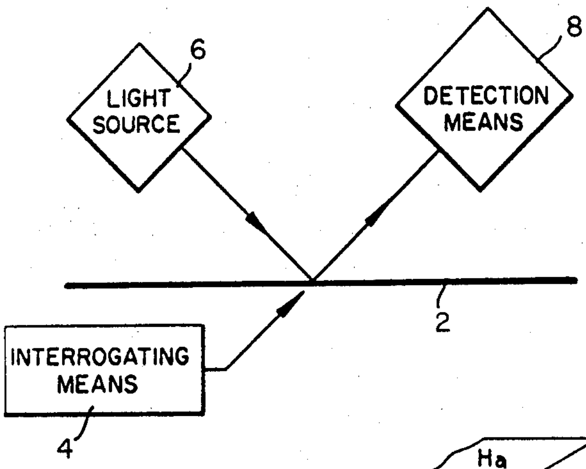

Referring to FIG. 1 there is shown by way of example, apparatus which is herein utilized to explain the broad concept of the present invention. Thus a magnetic recording medium 2 is provided having recorded therein information in the form of selected states of magnetization. An interrogating means 4 is operatively coupled to the medium 2 to modulate or alter the states of magnetization recorded therein. The interrogating means 4 may comprise any of various sources and coupling means for applying or example, a magnetic field, a local temperature, a strain, etc. A light source 6 such as a laser, is disposed to direct a light beam against the medium 2, and a light detection means 8 is disposed to receive the component of light reflected from the medium 2. In accordance with the invention, the states of magnetization recorded in the medium 2 are modulated or altered in response to the interrogation supplied by the interrogation means 4, whereby the modulated light received by the detection means 8 from one state of magnetization (e.g.; a "1" digit) is distinctive of that state and distinguishable from the modulated light received by detection means 8 from a different state of magnetization (e.g.; a "0" digit). Thus, detecting the modulated component of light reflected (or transmitted as in the Faraday effect) provides an indication of the states of magnetization and thus readout of the stored information.

Figure 2:
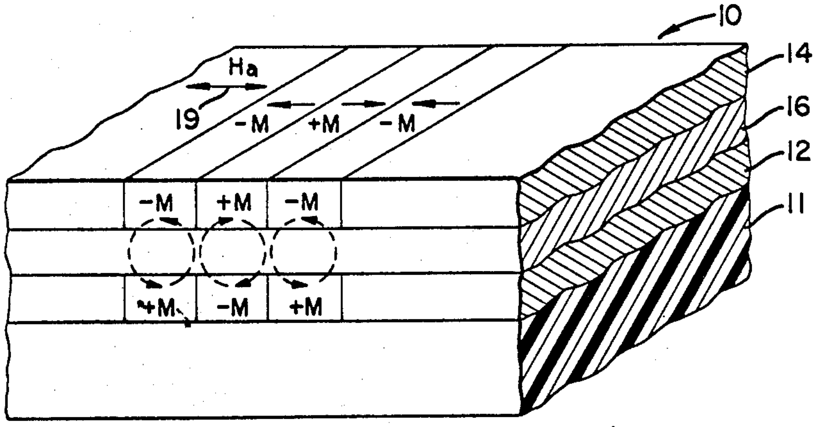
FIG. 2 is a perspective view of a portion of a three layer recording medium exemplifying one configuration of the special medium of the invention.

Referring now to the FIGURES there is shown by way of example only specific embodiments or applications of the broad concept of the invention. More particularly referring to FIG. 2 there is shown a first magnetic recording medium 10 utilizing a triple layer configuration, which, inter alia, enhances the performance of a magnetooptical readout system in accordance with the invention. The medium may be seen to define a heterogeneous structure, wherein the heterogenity is provided in the form of layers of different materials. The medium 10 consists of a substrate 11 of a material such as plastic, a storage layer 12 and a readout layer 14, which layers are separated from one another by a non-magnetic spacer layer 16. The magnetic information which is to be stored is recorded within the storage layer 12, as for example by a magnetic recording head (not shown). The storage layer 12 is formed of a magnetic material which exhibits the property of a relatively high coercive force, herein denoted $H_{cs}$. The readout layer 14, for which the magnetic information may be reproduced for example by means of the Kerr magnetooptic effect such as described in the aforementioned patent, is a magnetic material exhibiting the property of a relatively low coercive force, herein denoted by $H_{cr}$.

The storage layer 12 should be of sufficient thickness such that when magnetized it will produce a magnetic coupling field $h$ in the corresponding regions of the readout layer 14, which coupling field h is capable of magnetizing the layer 14. The coercive force $H_{cs}$of the storage layer 12 should high enough that an applied modulating field $H_a$ does not cause irreversible changes in the magnetization thereof. On the other hand, the coercive force $H_{cs}$ thereof should not be so prohibitively high that recording information in the storage layer will be difficult. The coercive force $H_{cr}$ and the thickness of the readout layer 14 should be sufficiently small that it can be easily magnetized by the coupling field h from the storage layer 12.

By way of example only, the recording medium 10 may utilize a storage layer 12 of a nickel-cobalt-phosphor alloy material with a thickness of for example between 50–10,000 A and a coercive force of the order of a few hundred oersteds. The non-magnetic layer 16 is deposited on the layer 12 and may be formed of a nickel-phosphor alloy material with a thickness of the order of a few hundred A. The readout layer 14 is deposited on the non-magnetic layer 16 and may be for example of a permalloy material having a thickness of from 50–10,000 A, and a coercive force of the order of a few oersteds. In this configuration of medium 10, the magnetic coupling mechanism existing between the layers 12 and 14 is a magnetostatic coupling effect. Magnetization states −M, +M and −M are shown in the FIG. 2 which may represent a "0", "1 " and "0" bit respectively. The modulating field $H_a$ is shown applied in a longitudinal mode as indicated by arrow 19.

Figure 3:
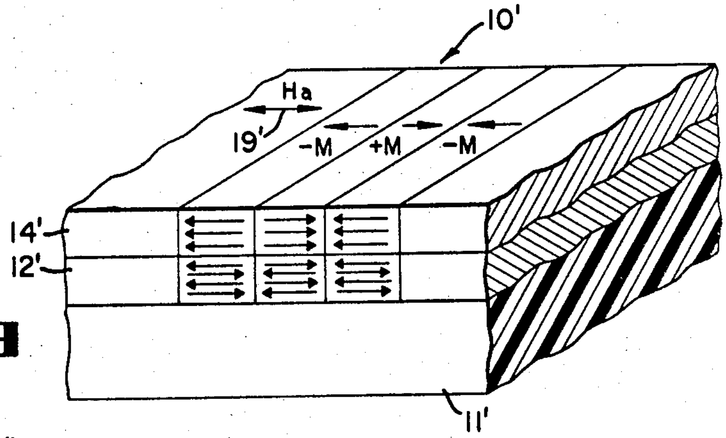
FIGS. 3 and 4 are perspective views of portions of two additional forms of the special medium exemplifying alternative configurations which may be utilized in the invention.

FIG. 3 shows an alternative heterogeneous structure defined in the form of layers of different coercive force materials wherein however, the coupling field between the storage and readout regions or layers is defined as an exchange interaction rather than as a magnetostatic interaction. Thus a recording medium 10' is shown formed of a substrate 11', upon which is deposited a storage layer 12' of a magnetic material such as a ferromagnetic, ferrimagnetic or antiferromagnetic material, which exhibits the property of a relatively high coercive force $H_{cs}$. A readout layer 14' formed of a magnetic material of a relatively low coercive force $H_{cr}$, is deposited directly upon the storage layer 12'. The magnetization of the readout layer 14' is provided by the adjacent storage layer 12' by means of the exchange interaction of previous mention, wherein the spin arrangement of the storage layer material nearest the low coercive force readout layer, determines the spin arrangement, i.e., the state of magnetization, of the readout layer 16' as depicted in FIG. 3. Thus −M, +M and −M may define a "0", "1" and "0" bit respectively. The modulating field $H_a$ is shown applied by way of example only in the longitudinal mode as indicated by arrow 19'. By way of example only, the ferromagnetic material could be cobalt, iron, nickel and related alloys; the ferrimagnetic material could be one of the various ferrites such as magnetite $FE_3O_4$ and the antiferromagnetic material could be $Cr_2O_3$, $\alpha$-$Fe_2O_3$ and NiO.

Figure 4:
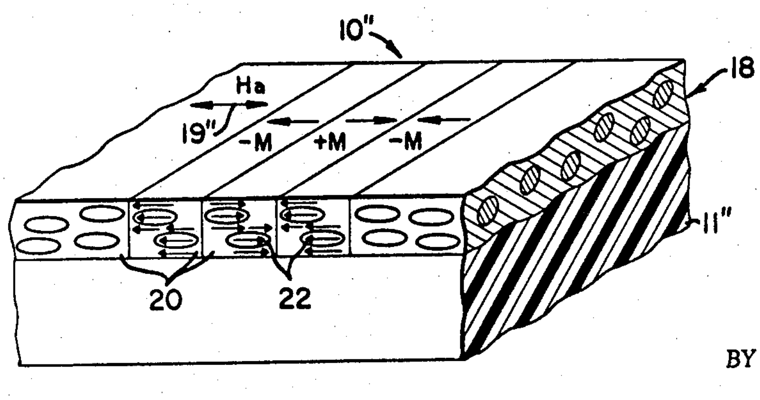

FIG. 4 shows another alternative heterogeneous structure defined in the form of two different coercive force materials, wherein one material is intermixed in the form of particles or precipitates within the other material to define a recording medium 10'' of a single layer 18 of heterogeneous composition deposited upon a substrate 11''. Accordingly, a readout region or layer 20 is defined as a proportion of the layer 18, and a storage "layer" or region is provided in the form of particles 22 interspersed throughout the cross section of the readout layer 20. The readout layer 20 is formed of a magnetic material of relatively low coercive force, and the storage particles 22 are formed of magnetic material such as ferromagnetic, ferrimagnetic or antiferromagnetic material. The coupling field between the storage particles 22 and the readout layer 20 accordingly is the same as that of the medium 10' of FIG. 3, i.e., an exchange interaction. Thus as shown in FIG. 4, −M, +M and −M may define a "0" and "1 " and "0 " bit respectively, and $H_a$ is applied in the longitudinal direction as indicated by arrow 19''.

Figure 5:
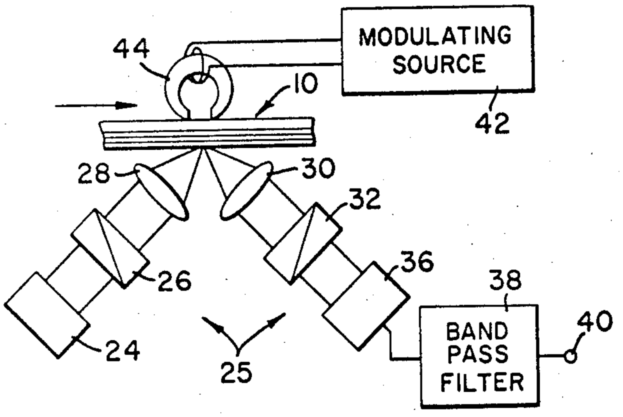
FIG. 5 is a schematic block diagram exemplifying apparatus which may be used in conjunction with the mediums of FIGS. 2, 3 and 4 in accordance with the invention.

The detection of the state of magnetization and thus of the information stored within the storage layer 12 of medium 10 may be accomplished utilizing a generally conventional magnetooptic readout system 25 such as shown in FIG. 5. Although the description hereinafter is made in conjunction with the medium 10 of FIG. 2 for convenience of description, it is to be understood that the medium 10 could be replaced with the medium 10' and/or 10'' of FIGS. 3 and/or 4 respectively. In accordance with the invention a modulating magnetic field $H_a$ which alternates at a selected frequency, which may vary within the range of for example, a hundred hertz to many megahertz, is applied to the magnetic recording medium 10. The peak value $H_p$ of the applied field $H_a$ is sufficiently large compared to $H_{cr}$ and the coupling force h existing between the layers 12, 14 so that it magnetizes the readout layer 14 in its direction, but is sufficiently small compared to $H_{cs}$ so that it does not disturb the information which is stored in the storage layer 12. The net effect of the modulating alternating field $H_a$ is to modulate the magnetization in the readout layer 14, which in turn causes a modulation of the output signal of the magnetooptic readout system. The modulating field $H_a$ is applied in such direction and with such a waveform configuration that the alternating component of the output signal of the magnetooptic readout system will be different either in phase or in amplitude for the different bits of information stored in the storage layer 12 as for example, "1" and "0" binary digits.

The magnetooptic readout system 25 is for the most part of conventional design and comprises for example a high energy light source 24 which directs a light beam through a polarizer 26 and condenser 28, whereupon the beam is focused on the surface of the medium 10. The beam is reflected from the medium 10 into an objective lens 30 through an analyzer 32 and into a light detecting means such as a photodetector 36. The electrical signal generated by the photodetector 36 is passed through a bandpass filter 38 and thence to an output terminal 40. The bandpass filter 38 provides means whereby the system 25 detects signals which are only in a frequency band which is centered around the frequency of the magnetization modulation. In accordance with the invention, the readout system 25 further includes an alternating modulating source 42 which is connected to means for applying the signal from the source 42 to the medium 10 in the form of the modulating magnetic field $H_a$, which means is depicted by way of example only, as a wide gap magnetic head 44. The head 44 may be oriented to provide the modulating magnetic field $H_a$ in a transverse or longitudinal direction to the magnetization states.

The magnetooptic readout system 25 of FIG. 5 is capable of discriminating against noise arising from spurious rotations to the plane of polarization due to surface imperfections as well as from spurious amplitude changes, because only amplitude fluctuations in a frequency band centered around the high frequency carrier can pass through the detection system, that is, through the bandpass filter 38 as previously described. Noise energy which lies outside the bandpass region of the detection system is greatly reduced.

Figure 6:
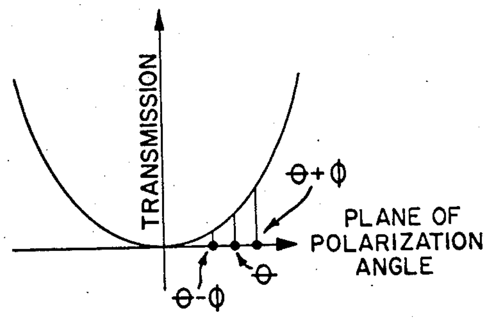
FIG. 6 is a graph representing the transmission function of an analyzer of the apparatus of FIG. 4, set at an angle $\theta$ from a selected reference position.

Given the time dependence of the magnetization of the readout layer 14, the photodetector output for the longitudinal Kerr effect is found from FIG. 6, which represents the transmission function of the analyzer 32 set at an angle $\theta$ from a reference position. $\phi$ is the Kerr angle, where $+\phi$ is the rotation of the plane of polarization for a $+M_s$ state of magnetization, and $-\phi$ is the rotation of the plane of polarization for a $-M_s$ state of magnetization. If $\theta$ is larger than $\phi$ the light transmitted by the analyzer will be approximately proportional to the magnetization seen by the readout beam, and thus the photodetector 36 output signal will be essentially proportional to the magnetization.

Figure 7:
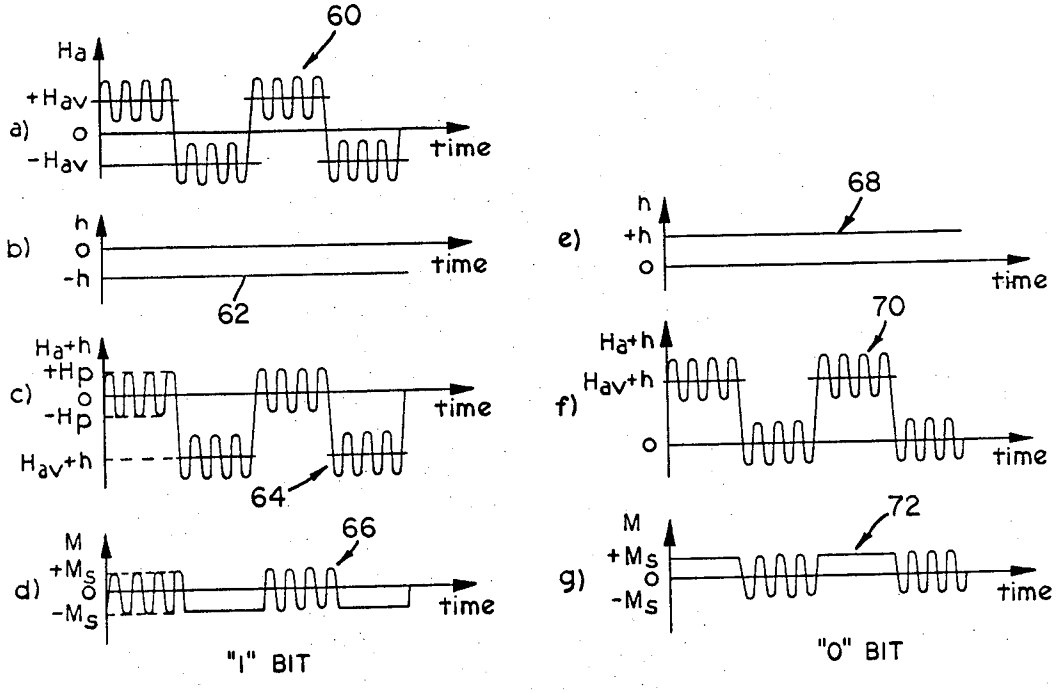
FIGS. 7 and 8 are two series of waveforms depicting alternative modes of performing the invention concepts, utilizing the application of longitudinal, alternating, modulating fields.
Figure 8:
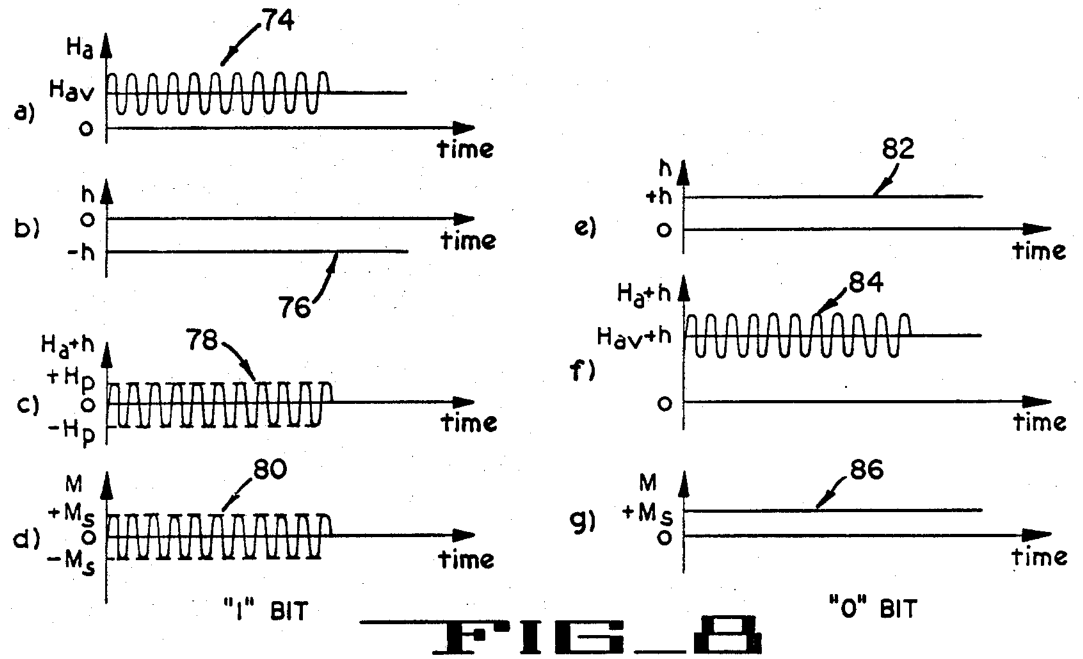
Figure 9:
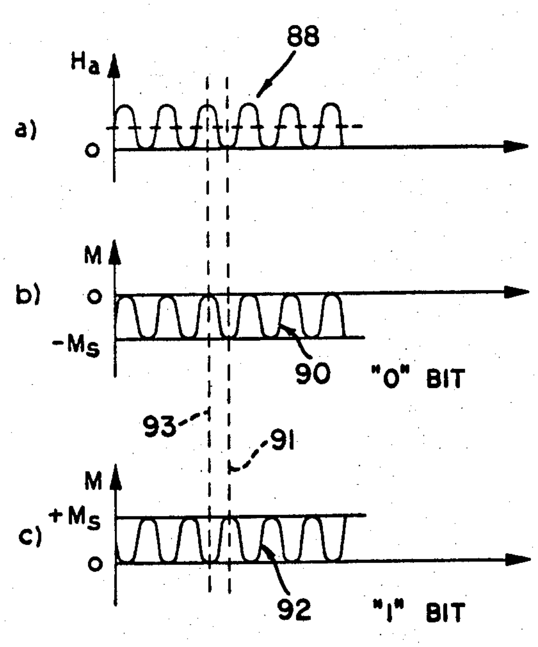
FIGS. 9 and 12 are two series of waveforms depicting yet other alternative modes of performing the invention concepts utilizing the application of perpendicular, alternating, modulating fields.
Figure 12:
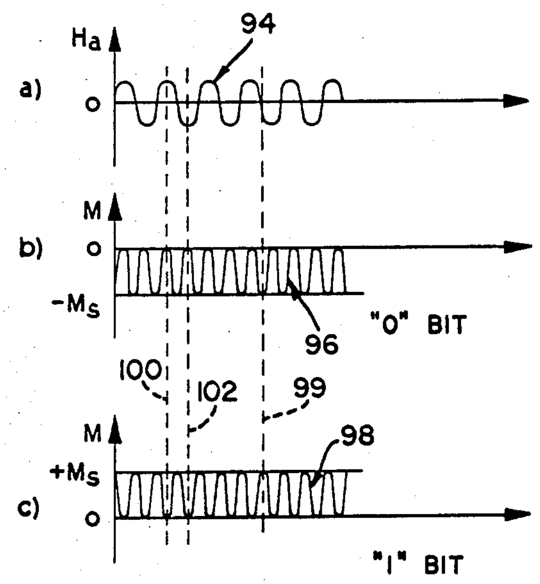

Typical examples of the applied field waveforms in accordance with the present invention, and the resulting mode of magnetization in the readout layers 14, 14' and 20 are shown in the FIGS. 7–10. FIGS. 7 and 8 show waveforms which describe the operation of the invention utilizing longitudinal, generally high frequency, modulating fields $H_a$ and FIGS. 9 and 12 show wave forms describing the invention operation when utilizing transverse modulating fields $H_a$. Thus the FIGURES depict embodiments where the modulating field $H_a$ is applied in either a longitudinal or transverse mode respectively relative to the direction of magnetization in the mediums 10, 10' and/or 10''.

More particularly, in FIG. 7 *a* waveform 60 represents the applied alternating modulating field $H_a$, shown with respect to time, wherein $H_a$ oscillates symmetrically about zero and where $H_{av}$ is the average value, either positive or negative, of the positive and negative excursions respectively, of the oscillating field $H_a$. FIG. 7 *b* shows a wave form 62 of the coupling field *h*, exerted by the storage layer upon the readout layer and defined for convenience here as negative for a "1" information bit. FIG. 7 *c* shows a waveform 64 of the total magnetic field felt by the readout layer 14; that is the summation of FIGS. 7 *a* and *b*. The magnitude of $H_{av}$ defined in FIG. 7 *a* is herein made substantially equal to the magnitude of *h*. If $H_{cr}$ is less than $H_p$ wherein $H_p$ is the peak value of the oscillating field $H_a$ as defined in FIG. 7 *c*, the state of magnetization which represents the "1" bit will vary with time as shown by a waveform 66 in FIG. 7 *d*. That is, it will oscillate about zero between $+M_s$ to $-M_s$ for the positive excursions of the applied field $H_a$, and will remain at the constant level $-M_s$ for the negative excursions of the applied field $H_a$.

The case of a "0" bit is shown in FIG. 7 *e – g*, wherein 7 *e* shows a waveform representing the coupling field +h exerted by the storage layer upon the readout layer and defined as positive for a "0" information bit. Thus when $+h$ is summed with the applied field $H_a$, of FIG. 8 *a*, there results a waveform 70 similar to waveform 64, but shifted to range from zero to positive values. FIG. 7 *g* shows a waveform 72 which represents the state of magnetization for a "0" bit, wherein the positive excursions of the applied field generate a waveform 72 of constant $+M_s$ level, and the negative excursions of the applied field $H_a$ generate an oscillation about zero and between $+M_s$ level, and the negative excursions of the applied field $H_a$ generate an oscillation about zero and between $+M_s$ and $-M_s$. Accordingly, the difference between the bits and thus the bits themselves can be detected by coincidence detection between the applied field $H_a$ and the electric signal of the photodetector 36.

FIG. 8 *a* shows a waveform 74 of the applied magnetic field $H_a$ which oscillates about an average constant value $H_{av}$, and which represents an alternative mode of applying the alternating, modulating field. Again a waveform 76 depicts the coupling field $-h$ exerted by the storage layer, as shown in FIG. 8 *b* and the resulting summed magnetic fields are shown in FIG. 8 *c* as waveform 78, which oscillates about zero from $+H_p$ to $-H_p$. $G_{av}$ of the applied field is maintained roughly equal to *h*, and $H_{cr}$ is small compared to $H_p$. Thus, as shown by a waveform 80 in FIG. 8 *d* the state of magnetization for a "1" bit will vary about zero from $+M_s$ to $-M_s$ with respect to time resulting in an output signal from the photodetector 36 having a frequency equal to that of the applied field $H_a$.

FIG. 8 *e – g* shows waveforms associated with a "0" bit, wherein a $-h$ represents the coupling field exerted by the storage layer 12, which when added to the applied alternating field $H_{av}$ of FIG. 8 *a* results in an oscillating waveform 84 which fails to pass through zero. Thus, as shown in 8 *g* by a waveform 86 the state of magnetization for a "0" bit remains at a constant level equal to a $+M_s$ value, whereby the photodetector output is a constant level, which results in a zero output signal when the constant level signal is passed through the bandpass filter 38. Accordingly, while in the previous scheme of FIG. 7, the output signals for the two kinds of bits differ essentially in terms of their phase, FIG. 8 depicts a readout scheme of the invention wherein the difference between the "0" and "1" bits is manifested in terms of an amplitude and not in terms of phase.

Referring to FIGS. 9 and 12 there are shown waveforms depicting alternative operations of the invention wherein the modulating field is applied in the transverse mode, i.e., wherein $H_a$ is applied in a direction perpendicular to the direction of magnetization of the information stored in the storage layer 12. In both schemes shown in FIGS. 9 and 12 the waveforms of the longitudinal component of the magnetization, and therefore the output signals for the two bits of information, differ in terms of their phase relative to the phase of the applied field $H_a$. The longitudinal component of magnetization may be defined as the component of magnetization in the readout layer parallel to the direction of the coupling field *h*. In FIG. 9, $H_a$ consists of an alternating field superimposed on a constant field component to form a waveform 88, and the output signals, which are substantially proportional to the longitudinal component of the magnetization as depicted in 9 *b* and *c*, consist of the frequency of $H_a$ and its harmonics. Thus referring to FIG. 9 *b* a waveform 90 depicts the longitudinal component of magnetization for a "0" bit as oscillating from zero to $-M_s$ and which equals a $-M_s$ value at such time as the applied field $H_a$ is equal to zero as shown by an extension line 91. On the other hand, in FIG. 9 *c*, a waveform 92 depicts the longitudinal component of magnetization for a "1" bit as oscillating from zero to a $+M_s$, wherein the value thereof is equal to a $+M_s$ at such time as the applied field $H_a$ is equal to zero. As shown by extension line 93, when the applied field $H_a$ is at a maximum value, the "0" bit waveform 90 is zero and the "1" bit waveform 92 is zero. Accordingly, the "0" bit and the "1" bit are represented by output signals which are exactly out-of-phase as depicted by waveforms 90 and 92 and may thus be sensed by conventional phase detecting apparatus (not shown) which becomes a part of the magnetooptic readout system 25.

Figure 10:
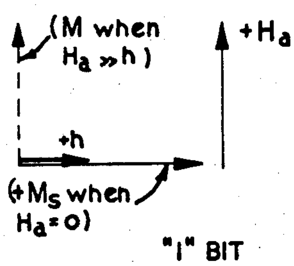
FIGS. 10, 11, 13 and 14 are vectorial representations of the alternative modes of the invention as depicted in FIGS. 9 and 12.
Figure 11:
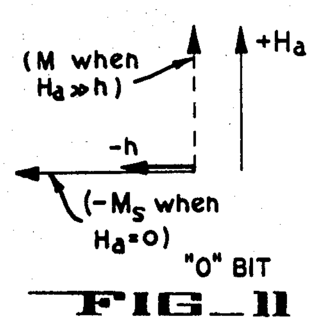

By the way of additional description, FIGS. 10 and 11 are vectorial representations of the magnetization in the readout region showing the direction of the saturation moment. FIG. 10 represents the magnetization for a "1" bit when utilizing a $+h$ coupling field between the storage and readout layers, and an applied modulating field $H_a$ which is applied transverse to the direction of magnetization stored in the storage layer, and which varies from a zero value to a positive value much larger than $+h$. Thus when the field $H_a$ is zero the moment is oriented in a direction parallel to the coupling field h and is equal to $M_s$. When the field $H_a$ is much larger than h and perpendicular thereto, the moment is oriented in a direction perpendicular to the coupling field $h$, and is equal to $M_s$. In FIG. 11, with the same applied field $H_a$, but where the coupling field h is negative, when the field $H_a$ is zero the moment is parallel to $h$ and is equal to $-M_s$, and when $H_a$ is much larger than $h$ and perpendicular thereto the moment is perpendicular to h.

In FIG. 12 *a* the modulating field $H_a$, applied in a transverse mode, is an oscillating field depicted by a waveform 94 which varies about zero from a positive $H_a$ value to a negative $H_a$ value. As shown in FIG. 12 *b*, the "0" bit is accordingly represented by the longitudinal component of magnetization as depicted by a waveform 96, which varies between zero and $-M_s$ value, but at a frequency twice that of the applied waveform 94 of FIG. 12 *a*. On the other hand, a "1" bit is represented by the longitudinal component of magnetization as depicted by a waveform 98, which varies from zero to $+M_s$ also at twice the frequency of the applied magnetic field $H_a$. Thus waveforms 96 and 98 are out-of-phase and are at a minimum $-M_s$ and maximum $+M_s$ respectively at such time as the applied waveform $H_a$ passes through zero, as shown by an extension line 99 in FIG. 12. Furthermore, as shown by extension lines 100 and 102, when $H_a$ is at either a positive or negative peak value, the waveforms 96 and 98 are at zero values respectively.

Figure 13:
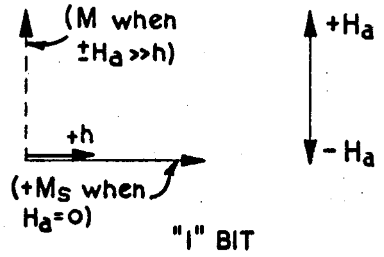
Figure 14:
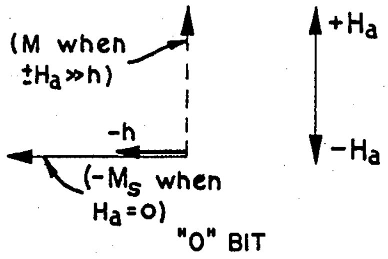

By way of further explanation, FIGS. 13 and 14 are vectorial representations of the magnetization in the readout region showing the direction of the saturation moment, wherein $H_a$ is applied transverse to the direction of the magnetization in the storage layer and varies from a peak positive value, through zero, and to a peak negative value. FIG. 13 represents the magnetization for a "1" bit when utilizing a $+h$ coupling field. When $H_a$ is positive and much larger than $h$, the moment is oriented in a direction perpendicular to $h$. When $H_a$ is zero the moment shifts to a direction parallel to the coupling field $h$ and is equal to $+M_s$. When $H_a$ goes to a negative value much larger than $h$, then the moment swings back to a direction perpendicular to $h$.

FIG. 14 represents the magnetization for a "0" bit when utilizing a $-h$ coupling field. When $H_a$ is positive and much larger than $h$, the moment is oriented in a direction perpendicular to $h$. When $H_a$ is zero the moment if oriented parallel to the field h and is equal to $-M_s$. When $H_a$ goes negative to a value much larger than $h$, then the moment again is perpendicular to the coupling field $h$. Thus it may be seen that the frequency of the moment rotation is twice that of the applied field $H_a$. In the embodiment of FIG. 12, "0" and "1" bits are represented by output signals which are exactly out-of-phase as depicted by waveforms 96 and 98 at twice the frequency of the field $H_a$, and may thus also be detected by conventional phase detecting apparatus (not shown).

Figure 15:
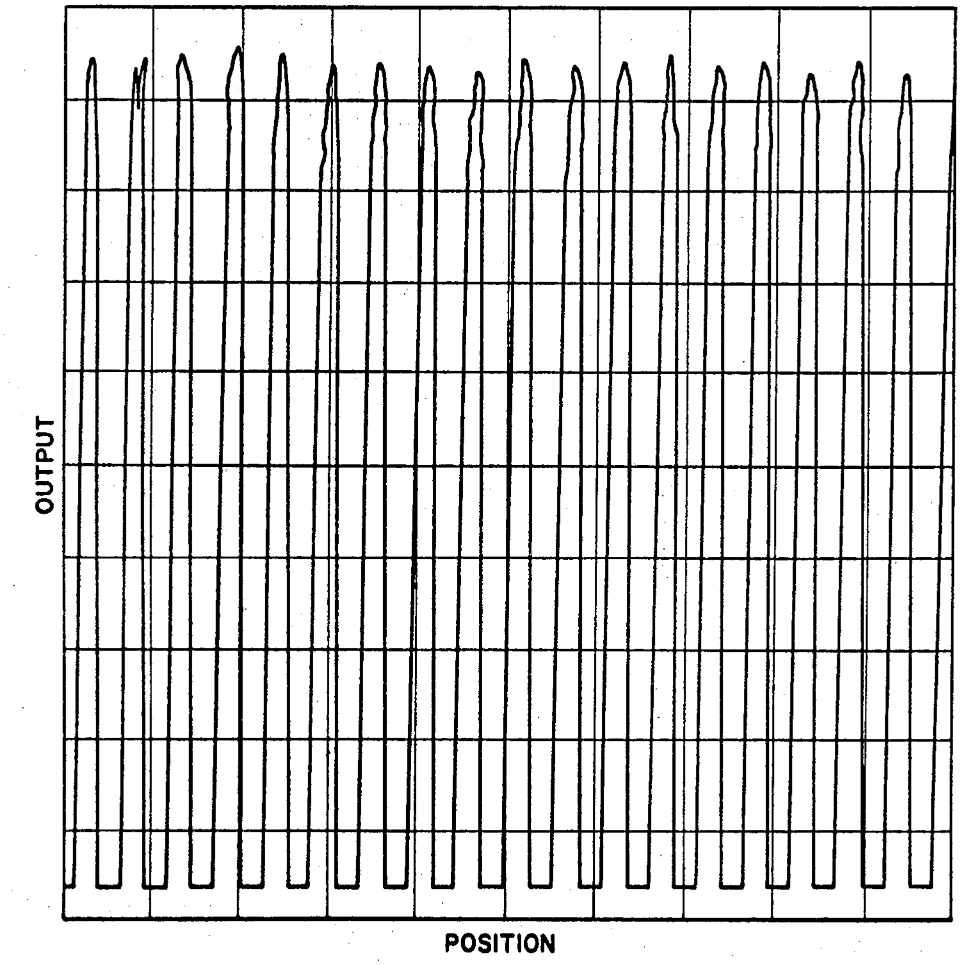
FIG. 15 is a graph showing a scan exemplifying the excellent quality of readout signal effected by means of the invention concepts.

FIG. 15 shows an example of a scan showing the excellent quality of the output signal achieved by readout in accordance with the invention concepts. The scan is of 50 micron bits using the modulation scheme of the invention with 180 milliamperes, 100 kilohertz, square wave, radio frequency signal. As may be seen the ratio of the radio frequency signal for "1" bits to that of "0" bits is in excess of 50 decibels, which is a rather remarkable difference.

Although the present invention has been described with respect to various embodiments, it is to be understood that additional variations and modifications may be made within the spirit of the invention. For example, for wideband frequency applications it would be preferable to use an applied modulating field $H_a$ of relatively high frequency, but for other applications of the invention concepts it may be desirable to use $H_a$ at a very low frequency of the order of hundreds of hertz. Although the invention concepts of FIGS. 7, 8, 9 and 12 are generally described with reference to the triple layered medium 10 of FIG. 2 and a magnetostatic interaction coupling effect, the mediums 10' and/or 10'' and the exchange interaction coupling effect are equally applicable. Likewise, although the longitudinal Kerr effect was used in the description of the invention, various other magnetooptic effects may be utilized instead, e.g., the Faraday and transverse effects, wherein thus the light which provides readout is transmitted through the medium rather than reflected therefrom. Note further that although the invention has been described herein with reference to a binary system and numbers, it is also applicable for use as an analog system based on analog information readout. Thus it is not intended to limit the invention except as defined in the following claims.

We claim:

1. Apparatus for improving the signal-to-noise ratio and thus the readout of a magneto-optic readout system which utilizes a removable magnetic recording medium for storing information in the form of selected states of magnetization, a beam of light adapted to impinge and scan said medium, and light receiving means disposed to receive the beam of light after same impinges the magnetic recording medium, the combination comprising:

a composite region having magnetically coupled integrally disposed storage and readout portions of relatively high and low coercive force all-magnetic materials respectively, disposed to define in part said removable magnetic recording medium; said region having erasably recorded therein information in the form of selected alterable states of magnetization, wherein the selected alterable states of magnetization of said readout portion are determined only by the magnetically coupled storage portion;

means operatively coupled to said medium for applying a temporary alternating interrogating external signal of a selected frequency superimposed upon a selected direct current signal to said medium to temporarily alter all the selected alterable states of magnetization in the readout potion of said region, said application of the interrogating external signal productive of temporarily modulating a component of the beam of impinging light to provide a distinctive component condition therein for each of the selected alterable states;

said light receiving means including light detection means responsive to the beam of light from the medium to sense the distinctive component conditions of the beam of light and thus the temporarily altered states of magnetization of the medium.

2. The apparatus of claim 1 wherein said region of integrally disposed portions further includes a portion of non-magnetic material disposed between the all-magnetic storage and readout portions, wherein the combination of portions forms the composite region of the recording medium wherein said magnetic coupling relation is exhibited as a magnetostatic effect.

3. The apparatus of claim 2 wherein said storage portion is formed of a nickel-cobalt-phosphor alloy material with a thickness of the order of from 50–10,000 Angstroms and a coercive force of the order of a few hundred oersteds;

said readout portion is formed of a permalloy material having a thickness of the order of from 50–10,000 Angstroms and a coercive force of the order of a few oersteds; and said non-magnetic portion is formed of a nickel-phosphor alloy material with a thickness of the order of a few hundred Angstroms.

4. The apparatus of claim 1 wherein said region of integrally disposed portions includes a layer defining said readout portion, and said storage portion is formed of storage particles in the form of precipitates interspersed throughout the readout layer and formed of a material of relatively high coercive force taken from the group consisting of ferromagnetic, ferrimagnetic and antiferromagnetic materials wherein said magnetic coupling relation comprises an exchange interaction.

5. The apparatus of claim 1 wherein said selected alterable states of magnetization are opposite orientations of magnetization which represent respective bits of information;

and wherein the distinctive component conditions are representative of said opposite orientations of magnetization.

* * * * *